US008490495B2

(12) United States Patent
Lee

(10) Patent No.: US 8,490,495 B2
(45) Date of Patent: Jul. 23, 2013

(54) CAPACITIVE PRESSURE SENSOR WITH VERTICAL ELECTRICAL FEEDTHROUGHS AND METHOD TO MAKE THE SAME

(75) Inventor: Steven Lee, Foster City, CA (US)

(73) Assignee: Consensic, Inc., Burlingame, CA (US)

( * ) Notice: Subject to any disclaimer, the term of this patent is extended or adjusted under 35 U.S.C. 154(b) by 488 days.

(21) Appl. No.: 12/774,488

(22) Filed: May 5, 2010

(65) Prior Publication Data

US 2011/0271764 A1    Nov. 10, 2011

(51) Int. Cl.
*G01L 9/12*   (2006.01)
*G01L 7/08*   (2006.01)

(52) U.S. Cl.
USPC ................................. 73/718; 73/715; 73/716

(58) Field of Classification Search
USPC .................................................... 73/715–721
See application file for complete search history.

(56) References Cited

U.S. PATENT DOCUMENTS

| | | | | |
|---|---|---|---|---|
| 4,025,942 A | * | 5/1977 | Kurtz | 257/417 |
| 4,222,277 A | * | 9/1980 | Kurtz et al. | 73/721 |
| 4,236,137 A | * | 11/1980 | Kurtz et al. | 338/4 |
| 4,773,972 A | * | 9/1988 | Mikkor | 156/89.15 |
| 4,790,192 A | * | 12/1988 | Knecht et al. | 73/721 |
| 5,187,985 A | * | 2/1993 | Nelson | 73/708 |
| 5,286,671 A | * | 2/1994 | Kurtz et al. | 438/50 |
| 5,511,428 A | | 4/1996 | Goldberg et al. | |
| 5,955,771 A | * | 9/1999 | Kurtz et al. | 257/419 |
| 6,212,056 B1 | | 4/2001 | Gammel et al. | |
| 6,293,154 B1 | * | 9/2001 | Kurtz | 73/727 |
| 6,341,527 B1 | | 1/2002 | Ishikura et al. | |
| 6,377,438 B1 | | 4/2002 | Deane et al. | |
| 6,465,271 B1 | * | 10/2002 | Ko et al. | 438/48 |
| 6,507,475 B1 | | 1/2003 | Sun | |
| 6,815,739 B2 | | 11/2004 | Huff et al. | |
| 6,909,589 B2 | | 6/2005 | Huff | |
| 6,922,327 B2 | | 7/2005 | Chua et al. | |
| 6,930,368 B2 | | 8/2005 | Hartwell et al. | |
| 6,948,374 B2 | | 9/2005 | Miyashita | |
| 7,111,518 B1 | | 9/2006 | Allen et al. | |
| 7,183,620 B2 | * | 2/2007 | Kurtz et al. | 257/419 |
| 7,331,241 B1 | * | 2/2008 | Kurtz et al. | 73/753 |
| 7,360,429 B1 | * | 4/2008 | Filippelli | 73/715 |
| 7,436,037 B2 | * | 10/2008 | Kurtz et al. | 257/419 |
| 7,458,275 B2 | * | 12/2008 | Kleven et al. | 73/756 |
| 7,539,003 B2 | | 5/2009 | Ray et al. | |
| 7,586,164 B2 | | 9/2009 | Musalem et al. | |
| 7,629,657 B2 | | 12/2009 | Partridge et al. | |
| 7,633,167 B2 | | 12/2009 | Kawano et al. | |
| 7,644,621 B2 | | 1/2010 | Silverbrook et al. | |
| 7,647,836 B2 | | 1/2010 | O'Brien et al. | |
| 7,662,653 B2 | | 2/2010 | O'Brien et al. | |
| 7,673,518 B2 | * | 3/2010 | Kurtz | 73/716 |

(Continued)

*Primary Examiner* — Lisa Caputo
*Assistant Examiner* — Jonathan Dunlap
(74) *Attorney, Agent, or Firm* — James M. Wu; JW Law Group

(57) ABSTRACT

A sensing device capable of detecting pressure using micro-electro-mechanical system ("MEMS") capacitive pressure sensor with vertical electric feed-through is disclosed. The sensing device includes a first sensing element, a second sensing element, and a sensing circuit. In one embodiment, the first sensing element is disposed over a semiconductor die and is configured to generate a first sensing signal upon detecting pressure. The second sensing element is also disposed over the semiconductor die adjacent to the first sensing element, and is configured to generate a second sensing signal upon sensing ambient conditions. The sensing circuit is capable of generating a pressure sensing signal in response to the first sensing signal and the second sensing signal.

20 Claims, 8 Drawing Sheets

U.S. PATENT DOCUMENTS

| | | | |
|---|---|---|---|
| 7,762,139 B2* | 7/2010 | Kurtz et al. | 73/714 |
| 7,775,117 B2* | 8/2010 | Kurtz | 73/721 |
| 7,866,215 B2* | 1/2011 | Kurtz | 73/721 |
| 7,874,216 B2* | 1/2011 | Kurtz et al. | 73/716 |
| 8,024,976 B2* | 9/2011 | Kurtz et al. | 73/713 |
| 8,104,353 B2* | 1/2012 | Drewes et al. | 73/718 |
| 8,227,029 B2* | 7/2012 | Birnstock et al. | 427/248.1 |
| 2003/0107096 A1* | 6/2003 | Kurtz et al. | 257/414 |
| 2003/0205090 A1* | 11/2003 | Jakobsen | 73/718 |
| 2010/0083764 A1* | 4/2010 | Kurtz | 73/721 |

* cited by examiner

CAPACITIVE PRESSURE SENSOR WITH VERTICAL ELECTRICAL FEEDTHROUGHS AND METHOD TO MAKE THE SAME

FIELD

The exemplary embodiment(s) of the present invention relates to micro-electro-mechanical systems ("MEMS"). More specifically, the exemplary embodiment(s) of the present invention relates to MEMS sensing devices.

BACKGROUND

A conventional pressure measuring device or a pressure sensor is able to measure pressure related medium, such as gas, speed, altitude, and/or liquid. Pressure is an expression of force associated with volume expansion of fluid or gas, and is usually measured in terms of force per unit area. A pressure sensor typically generates a signal indicating a pressure measurement when it detects the pressure. Pressure sensors have a variety of everyday applications in areas of industrial, military, as well as commercial applications.

Pressure sensors can alternatively be referred to as pressure transducers, pressure transmitters, pressure senders, speed sensing, pressure indicators, piezometers, et cetera. For example, pressure sensors may be employed in weather forecast instruments, aircrafts, automobiles, medical equipments, and any other types of machineries. Some pressure sensors, such as those found in some traffic enforcement cameras, function in a binary (on/off) manner when pressure is measured. A typical function for a pressure sensor is to complete or break an electrical circuit in accordance with the presence of pressure. These types of sensors are also known as a pressure switch, which is capable of measuring pressure.

A conventional pressure sensor has shortcomings of measuring range, reliability, durability, temperature sensitivity, accuracy, and/or power consumption.

SUMMARY

A sensing device is capable of detecting pressure using micro-electro-mechanical system ("MEMS") capacitive pressure sensor with vertical electric feed-through. The sensing device includes a first sensing element, a second sensing element, and a sensing circuit. In one embodiment, the first sensing element is disposed over a semiconductor die and is configured to generate a first sensing signal upon detecting pressure. The second sensing element is also disposed over the semiconductor die adjacent to the first sensing element, and is configured to generate a second sensing signal upon sensing ambient conditions. The sensing circuit is capable of generating a pressure sensing signal in response to the first sensing signal and the second sensing signal.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
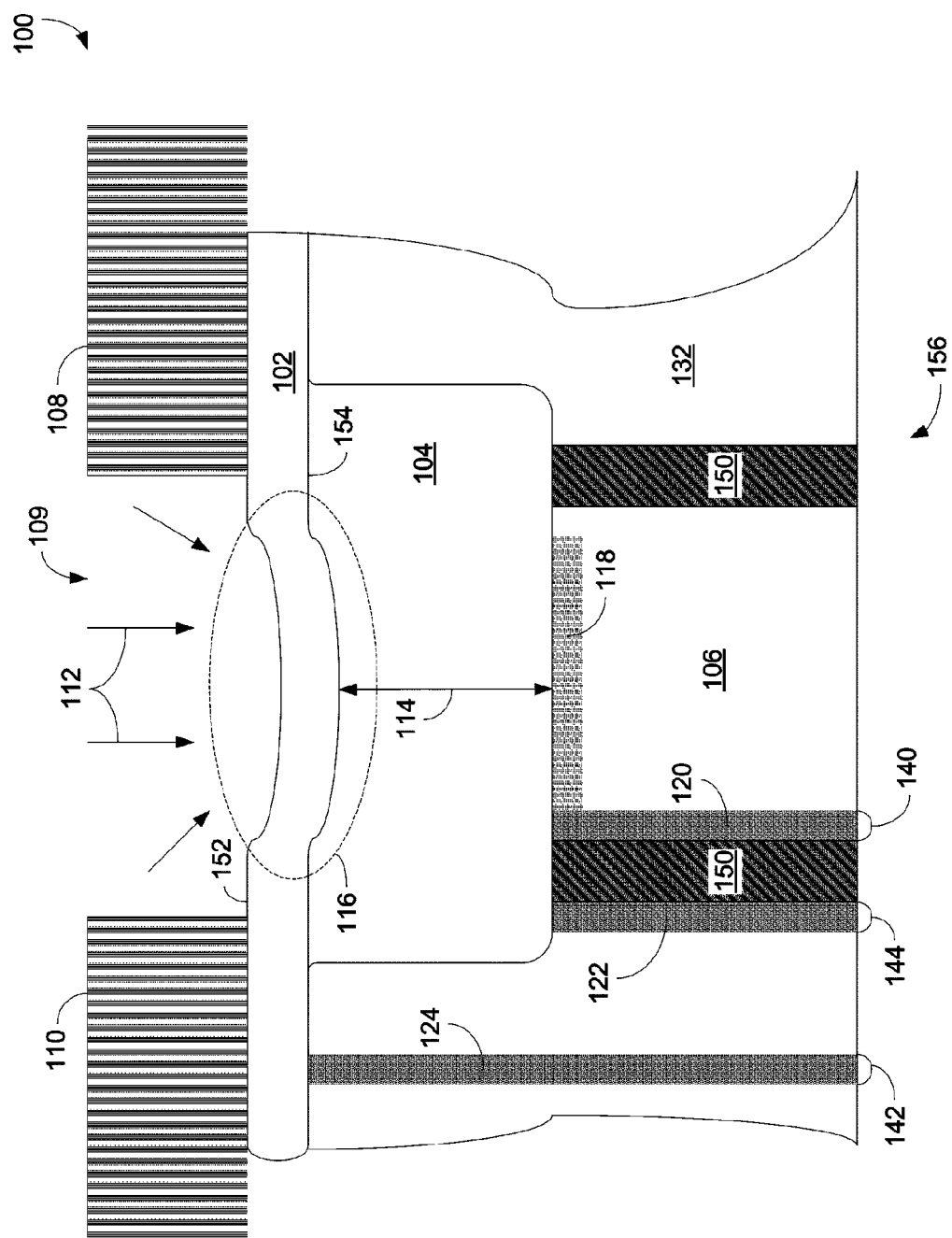
FIG. 1 is a block diagram illustrating a micro-electromechanical system ("MEMS") capacitive pressure sensor using vertical electric feed-through in accordance with one embodiment of the present invention.

Exemplary embodiment(s) of the present invention is described herein in the context of a method, system and apparatus of measuring pressure using a micro-electro-mechanical system ("MEMS") capacitive pressure sensor with one or more vertical electric feed-through.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skills in the art having the benefit of this disclosure.

It is understood that the embodiment(s) of the present invention may contain MEMS devices and/or circuits that are readily manufacturable using well-known art, such as CMOS ("complementary metal-oxide semiconductor") processing technology, or other semiconductor manufacturing processes. In addition, the embodiment(s) of the present invention may be implemented with other manufacturing processes for making semiconductor or silicon based electrical and/or MEMS devices.

As used herein, the symbol n+ indicates an n-doped semiconductor material usually having a doping level of n-type dopants on the order of $10^{21}$ atoms per cubic centimeter. The symbol n− indicates an n-doped semiconductor material typically having a doping level on the order of $10^{17}$ atoms per cubic centimeter. The symbol p+ indicates a p-doped semiconductor material typically having a doping level of p-type dopants on the order of $10^{21}$ atoms per cubic centimeter. The symbol p− indicates a p-doped semiconductor material typically having a doping level on the order of $10^{17}$ atoms per cubic centimeter. Those of ordinary skills in the art will now realize that the devices described herein may be formed on a conventional semiconductor substrate or they may as easily be formed as a thin film transistor ("TFT") above the substrate, or in silicon on insulator ("SOI") such as glass ("SOG"), sapphire ("SOS"), or other substrates as known to those of ordinary skills in the art. Such persons of ordinary skills in the art will now also realize that a range of doping concentrations around those described above will also work. Doped regions may be diffusions or they may be implanted.

Embodiment(s) of the present invention discloses a solid state MEMS capacitive pressure sensor capable of measuring applied pressure of gas, liquid, fluid, chemical properties, speed, altitude, et cetera. Monitoring change of chemical properties, for example, includes sensing ionic changes within the medium. The sensor, in one embodiment, utilizes more than one exposed sensing elements to the medium for accurate measurement.

A solid state sensing device, for example, includes an active pressure sensing element (or sensor), a static sensing element (or sensor), and a reference sensing element. While one or more of the active pressure sensing elements actively measure the applied pressure, the static sensing element(s) records ambient measurements and is not affected or sensitive to the applied pressure. The static sensing element, for instance, is capable of measuring various effects caused by factors, such as mechanical stress, thermal stress, electrostatics, ionic contamination, dielectric changes, defects, radiation, temperature, and so forth. The static reference signal(s) measured by the static sensing element provides specific static attributes that do not change due to the presence of pressure. The static reference signal(s), in one example, is subtracted from the primary pressure measuring signal(s) generated by the active pressure sensing element to improve accuracy of the intended pressure measurement. In addition, a (absolute) reference sensing element, which may be isolated from ambient conditions, provides an absolute reference signal(s) which are not affected by applied pressure as well as ambient conditions.

The solid state (or semiconductor) sensing device capable of detecting pressure includes a MEMS capacitive pressure sensor ("MCPS") with vertical electric feed-throughs. The sensing device includes a first sensing element, a second sensing element, and a sensing circuit. In one embodiment, the first sensing element, which is a pressure sensor, is disposed over a semiconductor die and is configured to generate a primary pressure sensing signal upon detecting pressure. The second sensing element, which is a static sensor, is also disposed over the semiconductor die adjacent to the first sensing element, and is configured to generate a second sensing signal upon sensing ambient conditions. The sensing circuit generates a pressure sensing signal in response to the first sensing signal and the second sensing signal.

FIG. 1 is a block diagram 100 illustrating an MEMS capacitive pressure sensor having one or more vertical electric feed-throughs in accordance with one embodiment of the present invention. Diagram 100, in one embodiment, includes a conductive flexible diaphragm 102, an internal gap 104, vertical electric feed-throughs 120-124, and a semiconductor substrate 132. Diaphragm 102, in one aspect, is used as a top electrode (or plate) of a sensing element(s), while bottom doped sidewall 118 is configured as a bottom electrode (or plate) of a sensing element(s) (or MCPS). It should be noted that the underlying concept of the exemplary embodiment(s) of the present invention would not change if one or more blocks or layers were added to or removed from diagram 100.

Semiconductor substrate 132 is made of semi-conductive or non-conductive (dielectric) substance which can include any types of semiconductor materials such as silicon, low doped silicon, germanium, gallium arsenide, or the like. The MCPS is deposited or fabricated over semiconductor substrate 132 via a conventional semiconductor fabrication process. A pillar 106, which can be a layer or bulk of non-conductive or low-conductive semiconductor materials, is situated adjacent to internal gap 104 is a part of substrate 132. In addition, layers 108-110 may have similar or the same property of electrical conductivity materials as substrate 132. Note that the terms "MEMS capacitive pressure sensor" and "internal gap" may also be referred to as "pressure sensor" and "gap", respectively.

Diaphragm 102 is structured with flexible conductive materials such as a heavily doped silicon layer, wherein the physical structure of diaphragm 102 is able to deflect under pressure as shown in the dotted circle 116. For example, when an exposed surface 152, which faces a pressure port 109 and exposes to pressure 112, deflects its exposed surface 152 away from pressure port 109, a second surface 154 bends or curves toward gap 104. When diaphragm 102 deflects into gap 104, the physical shape or volume of gap 104 changes. Pressure 112 is sensed or detected by the pressure sensor when distance change 114 inside gap 104 is detected or sensed. Note that gap 104 can also be referred to as air chamber, air space, or gas chamber representing the space between two plates or electrodes in a capacitor. Gap 104 can be filled with air, gas, liquid, et cetera.

Diagram 100 further includes two insulators 150 made by any types of dielectric materials such as oxide and/or polysilicon. Insulators 150 not only provide separation between vertical electric feed-throughs 120-122, but also provide structural support for the pressure sensor. The sensitivity of pressure sensor, in one embodiment, will be determined by the dimension and/or layout of each pressure sensor. In other words, the physical relationship between various components, such as diaphragm, pressure port, gap, and insulators, determines the sensitivities of a sensor. For example, the dimension of insulators 150 defines the dimension of pillar(s) 106 which at least partially identifies bottom doped sidewall or bottom electrode 118 as well as vertical electric feed-throughs 120-122.

Vertical electric feed-throughs 120-124, in one embodiment, are fabricated on sidewalls of silicon layers or pillar by doping n+ via a semiconductor doping process. While vertical electric feed-through 124 carries a current between input/output ("I/O") pad 142 and diaphragm 102, vertical electric feed-through 120 is capable of carrying electrical current between bottom electrode 118 and I/O pad 140. Vertical electric feed-through 122 connected to I/O pad 144, in one example, may be used for other functions such as electrostatic discharge ("ESD"). It should be noted that additional wirings and pads may be added to the front side of device 156.

Referring back to FIG. 1, the pressure sensor, in one embodiment, includes diaphragm 102, gap 104, and an electric feed-through 120 wherein diaphragm 102 is formed with flexible materials capable of deflecting under pressure. Gap 104 is situated under pressure diaphragm 102 capable of altering its physical shape in response to the deflection of pressure diaphragm. Electric feed-through 120 is formed on the sidewall of a silicon pillar 106 which is situated between gap 104 and an electrical contact or pad 140 for conducting electrical signals. A circuit configured to process detected pressure measurements, in one embodiment, receives signals through pads 140-144 before signal processing. Note that pressure diaphragm or diaphragm 102 is a flexible electrode capable of conducting electrical signal.

Pressure diaphragm 102, in one example, includes first surface 152 and second surface 154 wherein first surface 152 exposes to pressure port 109 while second surface 154 is adjacent to gap 104. Gap 104 includes a first side and a second side, wherein the first side of gap 104 is adjacent to second surface 154 of pressure diaphragm 102, and the second side of gap 104 is adjacent to a first side 118 of silicon pillar 106. The first side of silicon pillar 106 is electrical conductive via doping process and is a second electrode of the pressure sensor. An electric feed-through 120 is formed on a second side of silicon pillar 106 via doping process wherein electric feed-through 120 transports capacitive charge from deflecting electrode 102 across gap 104 to second electrode 118 to reach an output terminal 140. The pressure sensor further includes a dielectric wall 150 between one or more sidewalls 120-122 for insulation and structure support.

Figure 2:
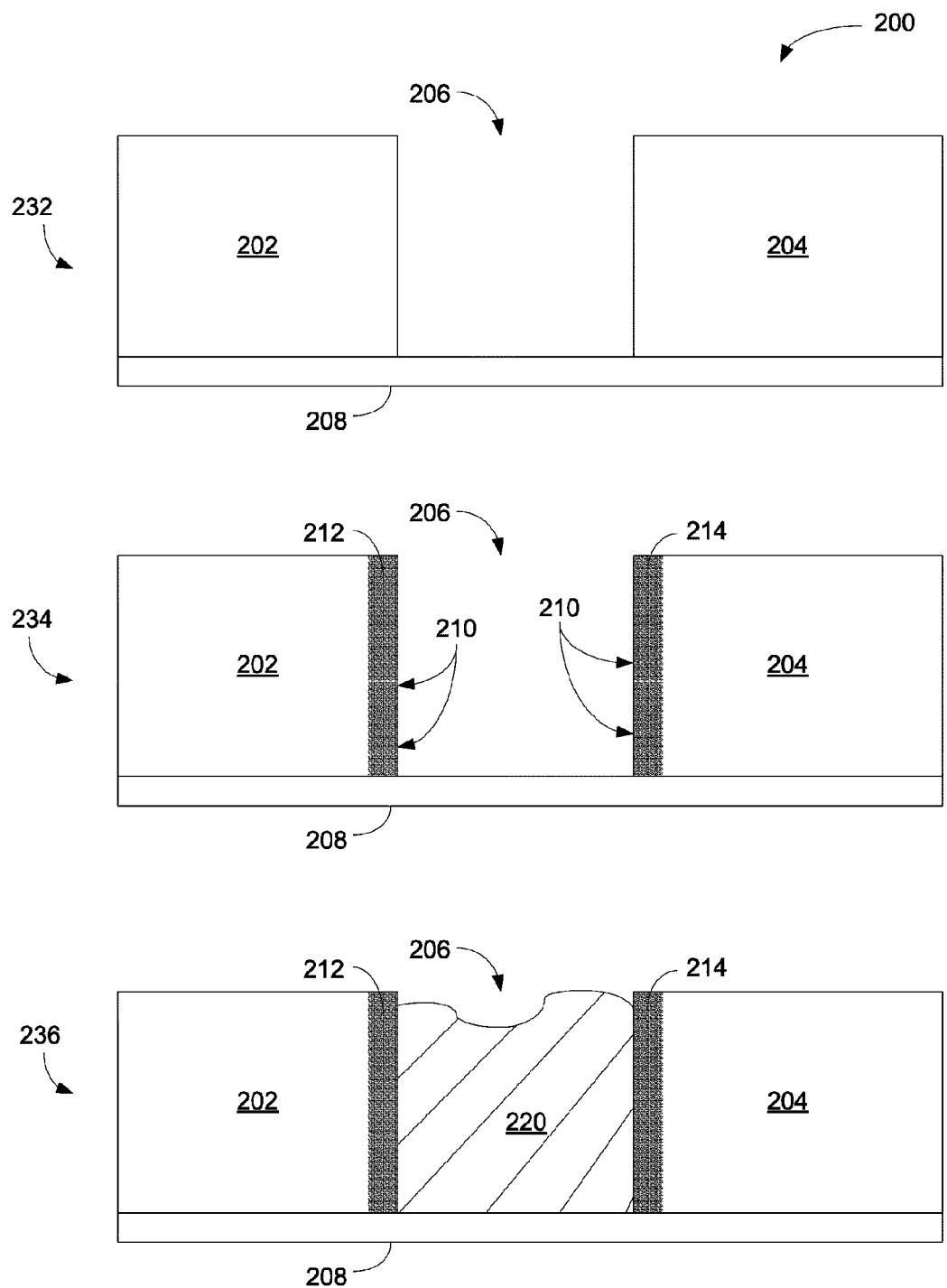
FIG. 2 illustrates a process of fabricating vertical electric feed-through in accordance with one embodiment of the present invention.

Having briefly described embodiments of the MCPS using vertical electric feed-throughs in which the exemplary embodiment of present invention operates, FIG. 2 illustrates a process 200 of fabricating vertical electric feed-through in accordance with one embodiment of the present invention. Process 200 illustrates steps 232-236 to construct a vertical electric feed-through via a conventional semiconductor fabrication process. At step 232, after creating a trench 206 on a substrate via a conventional etching process, portions of substrates 202-204 are formed as pillar-like configuration adjacent to a layer of oxide 208. The substrate, in one example, is made of non-conductive or low-conductive semiconductor materials, such as silicon, germanium, gallium arsenide, glass, plastic, or ceramic.

A process of doping, diffusion, or ion implantation to introduce additional dopants to the vertical sidewalls of substrate 202-204 is implemented at step 234. Diffusion 210 to sidewalls 202-204, for example, is a process of intentionally introducing impurities into a semiconductor to change its electrical properties. For example, upon sufficient implantation with dopants n+, the electrical property of sidewalls 212-214 change from non-conductive to conductive materials whereby they can carry charges or current.

Upon formation of vertical feed-throughs or conductive layer(s) 212-214 on sidewalls 202-204, trench 206, at step 236, is refilled with dielectric semiconductor materials to insulate or separate vertical conductive layer(s) 212-214 from cross talking. The dielectric semiconductor material includes porcelain (ceramic), mica, glass, plastics, and/or oxides of various metals. Since sidewall vertical conductive layers 212-214 are capable of facilitating electrical current to travel from one end of sidewall vertical conductive layers 212-214, vertical electric feed-throughs 212-214 are formed. It should be noted that the underlying concept of formation of the vertical electric feed-through would not change if other methods or process of fabricating feed-throughs were introduced in process 200.

Figure 3:
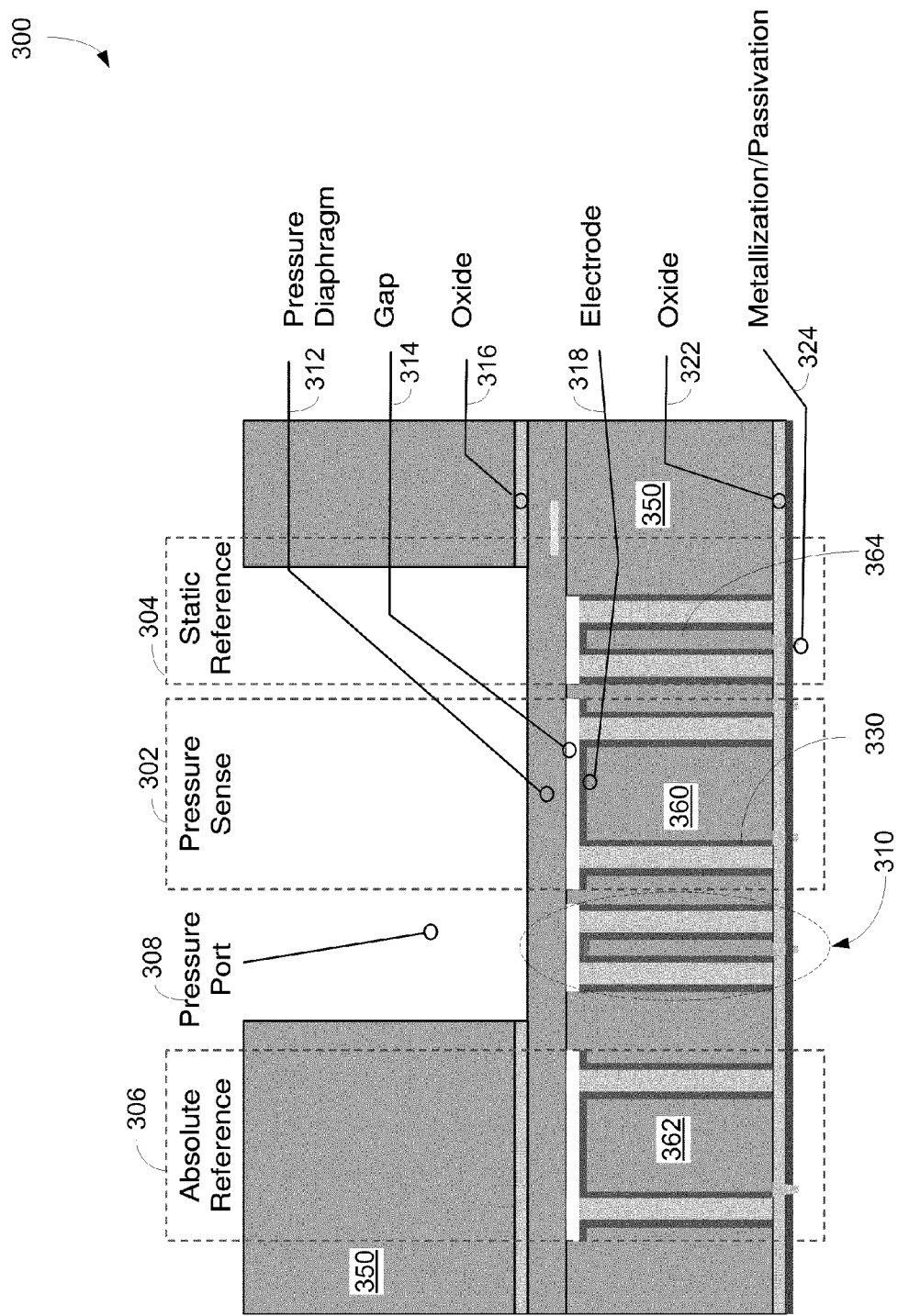
FIG. 3 is a block diagram illustrating a semiconductor die having at least three sensing elements in accordance with one embodiment of the present invention.

FIG. 3 is a block diagram illustrating a solid state semiconductor device 300 having at least three sensing elements in accordance with one embodiment of the present invention. Device 300, in one embodiment, includes a capacitive pressure sensing element 302, a static sensing element 304, and a reference sensing device 306. Device 300 is constructed based on a solid state semiconductor substrate wherein the substrate includes non-conductive or low-conductive semiconductor materials 350 such as silicon or low-doping silicon material. Various oxide layers 316 and 322 are disposed in the substrate for insulation as well as structure support. Depending on applications, additional sensing element(s) 310 may also be deposited in device 300 for performing other sensing functions such as humidity and/or altitude measurement. It should be noted that the underlying concept of the exemplary embodiment(s) of the present invention would not change if one or more blocks were added to or removed from device 300.

Capacitive pressure sensing element 302, in one embodiment, is similar to the pressure sensor described in FIG. 1, and is able to actively measure or sense the pressure through a pressure port 308. For example, pressure sensing element 302 is able to measure pressure generated through gas, speed, altitude, liquid, and the like presented in pressure port 308. Pressure sensing element 302, in one embodiment, includes a pressure diaphragm 312, gap 314, vertical electric feed-throughs 330, bottom electrode 318, silicon pillar 360 and metallization 324. Diaphragm 312 is made of flexible conductive material capable of conducting electrical current as well as physically deforming under pressure. As described earlier, diaphragm 312 is one (or top) plate of capacitive sensor 302 while electrode 318 is another plate of capacitive sensor 302. The electric signals travel through vertical electric feed-throughs such as feed-through 330 from the sensing end of device to contacts or pads. When diaphragm 312 exposes to a media of pressure, pressure sensing element 302 generates a pressure signal in response to the amount of deflection of diaphragm 312. Depending on the applications, the dimension of pressure sensing element 302 can be adjusted to meet the specific pressure measurement requirements. Note that the pressure signal generated by pressure sensing element 302 provides information relating to pressure measurement and ambient conditions. In an alternative embodiment, the pressure sensor can be configured to be an absolute pressure sensor by filling desired internal pressure, in the cavity as a known reference internal pressure for specific measurements.

Static sensing element 304, which has similar structure as pressure sensing element 302, includes a pressure diaphragm, gap, vertical electric feed-through, bottom electrode, and silicon pillar 364. Due to geometry of static sensing element 304, diaphragm of static sensing element 304 does not deflect under pressure even though static sensing element 304, like pressure sensing element 302, exposes to the pressure at pressure port 308. Because of the unique dimensional design, static sensing element 304, in one embodiment, provides static reference signals indicating the ambient or surrounding conditions, such as mechanical stress, thermal stress, electrostatics, ionic contamination, dielectric changes, defects, radiation, temperature, and humidity. As such, a more accurate pressure signal can be obtained by subtracting the static reference signal from the pressure signal. In other words, the static reference signal can be used to compensate the pressure signal to generate an enhanced pressure signal that is more accurate in representing the pressure at pressure port 308.

Reference sensing element 306, which has similar structure as pressure sensing element 302, includes a pressure diaphragm, gap, vertical electric feed-through, bottom electrode, and silicon pillar 362. Since reference sensing element 306 is completely embedded in device 300 and does not exposed to pressure port 308, reference sensing element 306 provides an absolute reference signal which does not include information relating to the ambient conditions. Since the absolute reference signal is not influenced by the pressure at pressure port 308, the absolute reference signal can be used as starting point and/or baseline reference without the effect of ambient conditions and pressure at pressure port. For example, the absolute reference signal(s) can be useful for device calibration to remove device defects and contaminations.

During an operation, pressure presented at pressure port 308 is applied to top electrode or diaphragm 312 of pressure sensor 302 and static reference element 304. Reference element 306 is fully enclosed within device 300 whereby element 306 is isolated from the ambience as well as pressure conditions at pressure port 308. Gap 314 allows diaphragm 312 to deflect under pressure into gap 314 toward bottom electrode 318. Upon detecting capacitive charges due to the shape change of gap 314, various sensing signals generated by sensors 302-306 are collected or outputted through conductive vias and/or metal traces 324.

A sensing device or device 300, in one embodiment, includes a pressure sensing element 302 and a static sensing element 304. Pressure sensor 302 is disposed over a semiconductor die 350 and generates a first sensing signal upon detecting pressure. Static sensor 304 is also disposed over the semiconductor die adjacent to pressure sensor 302, and generates a second sensing signal upon sensing ambient conditions. The terms "pressure sensor" and "pressure sensing element" can be used interchangeably. Also, the terms "static sensor" and "static sensing element" can be used interchangeably. A sensing circuit, which can be an ASIC circuitry capable of performing digital logic functions, is able to generate pressure sensing signal in response to the first sensing signal and the second sensing signal. Device 300 further includes an absolute sensor 306 which can also be referred to as reference sensing element for providing an absolute reference signal indicating an absolute condition. The absolute sensor is also disposed over semiconductor die 350 adjacent to pressure sensor 302.

An advantage of using the disclosed embodiments of MCPS is to reduce power consumption which is especially important to battery operated portable electronic devices.

Another advantage of using the disclosed embodiments of MCPS is to improve corrosion resistance because of silicon construction. As such, disclosed MCPS is able to operate in extreme and/or corrosive conditions, such as high temperature, harsh and corrosive fluids, corrosive chemicals, harsh ambient conditions, extreme high and low pressure ranges, and so forth. In one embodiment, a silicon to silicon fused cavity is hermetically sealed which prolongs accurate measurements without drifting overtime.

Another advantage of using the disclosed embodiments of MCPS is to reduce physical dimension of MCPS using compact construction via solid state fabrication technologies. For example, while the MCPS has a dimension of no more than 1 millimeter ("mm") in length, 1 mm in width, and 0.7 mm in height, the MCPS still contains at least a pressure sensing element, a static reference sensing element, and an absolute reference sensing element on a single die or chip. Note that the relative small configuration can improve yield while reducing manufacturing steps and cost.

Utilizing vertical feed-throughs within MCPS is another advantage since vertical feed-throughs are able to transmit sensed capacitive charges at the pressure port end to one or more pads which are located on the opposite end of the pressure port. Since the metal pads, contacts, traces, and/or wire-bonds are largely shielded from direct exposure to the corrosive medium, the durability and reliability of MCPS is enhanced.

Figure 4A:
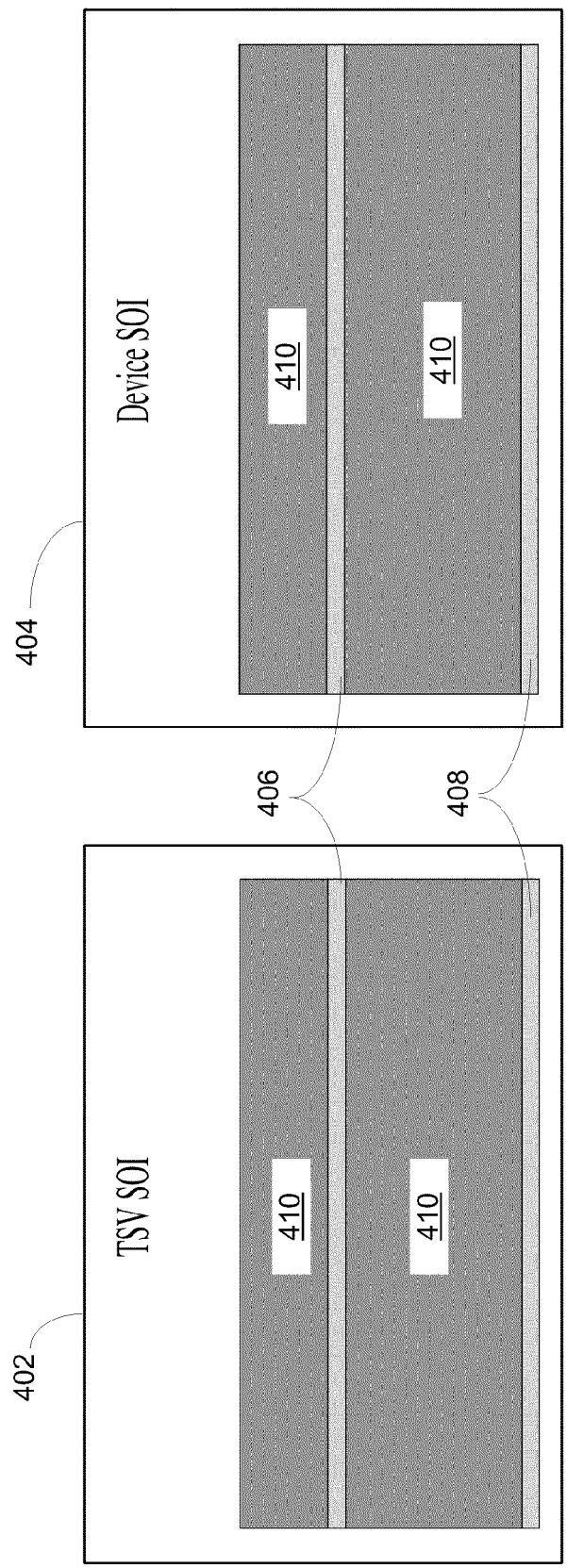
FIGS. 4A-D are diagrams illustrating a process of fabricating a sensing device having three sensing elements in accordance with one embodiment of the present invention.

FIGS. 4A-D illustrate a semiconductor process for fabricating a sensing device or an MCPS having three sensing elements in accordance with one embodiment of the present invention. FIG. 4A shows two Silicon-on-Insulator ("SOI") substrates or wafers 402-404, hereinafter referred to as wafer, wherein wafer 402 is, in one example, a through silicon via ("TSV") SOI. Wafers 402-404 includes non-conductive or low doped silicon wafer 410 including multiple oxide layers 406-408. The MCPS, in one embodiment, can be fabricated using wafers 402-404 as basic building materials or block to deposit multiple sensing elements or devices. Other types of semiconductor substrates may also be used to replace wafers 402-404. It should be noted that the underlying concept of the exemplary embodiment(s) of the present invention would not change if one or more blocks or layers were added to or removed from FIG. 4A.

Figure 4B:
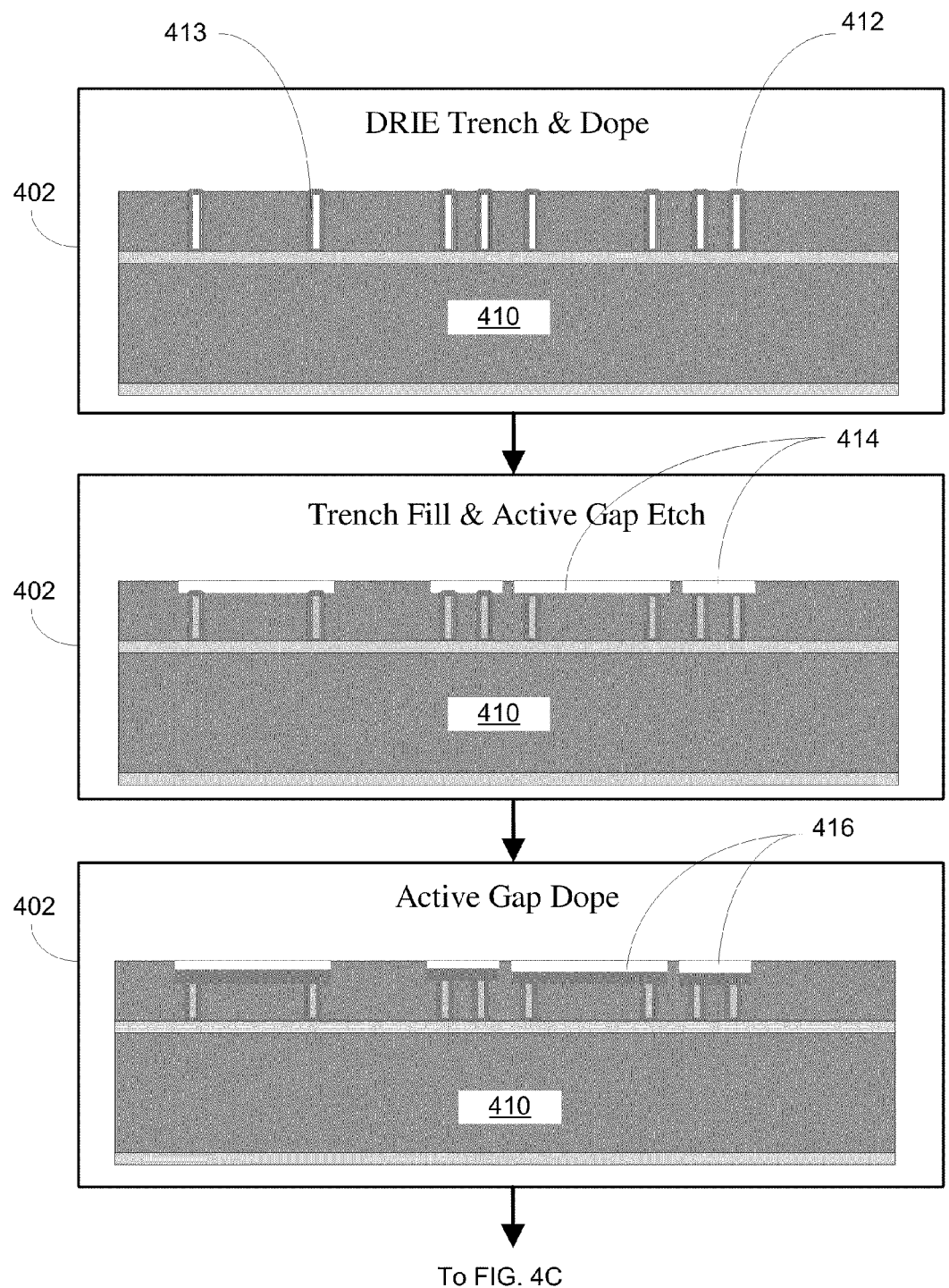

FIG. 4B illustrates a process of fabricating or building various semiconductor components such as gaps 414 and feed-throughs 413 in a sensing device having three sensing elements in accordance with one embodiment of the present invention. On the first SOI wafer or wafer 402, a pattern is lithographically printed to the front side of wafer 402. Upon removing the exposed silicon of the pattern using the process of deep reactive ion etch ("DRIE") through entire silicon thickness of the device, multiple exposed trenches are created. Wafer 402 is then cleaned and diffused with dopants to form conductive surfaces to establish feed-throughs 413. The diffusion process introduces impurities or dopants to the shallow depth of exposed areas of silicon. After formation of feed-throughs 413, the exposed trenches are refilled with dielectric material such as, but not limited to, oxide and poly-silicon. The deposited fillers 412 provide electrical isolation to various active regions as well as providing structural strength or support.

After filling the trenches, another pattern is lithographically printed at the same front side to create gap(s) 414. The exposed silicon pattern is etched to a predefined depth which is approximately the height of the gaps. Note that the formed gap(s) 414 between the top electrode (or diaphragm) and the base (or bottom) electrode creates a capacitive sensor(s). Upon formation of gap(s), a second diffusion process is activated to diffuse dopants (or impurities) to the bottom surface areas of gap(s) to form bottom electrode(s) 416 for capacitive sensors. Note that the capacitive sensor is connected to the lateral conduction path of the trenches.

Figure 4C:
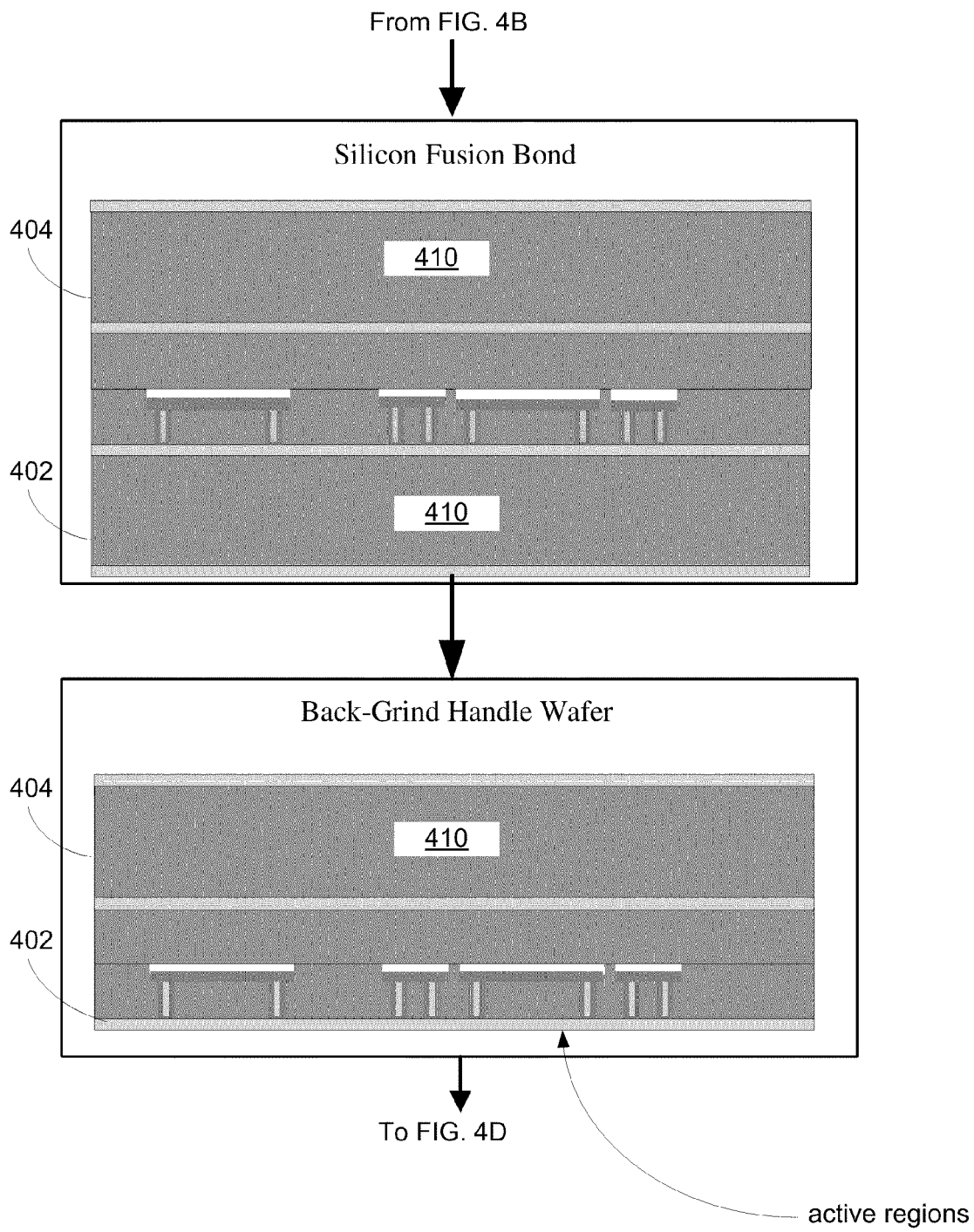

FIG. 4C illustrates a process of having SOI wafers 402 and 404 cleaned and combined in accordance with one embodiment of the present invention. Two wafers 402-404 are joined with the front-side to the front-side by a fitting process of wafer bonding. For example, wafers 402-404 are joined by silicon to silicon fusion bonding process using either low-temperature plasma enhanced bond annealing or high-temperature post bond annealing. After bonding, the back-side of first processed SOI wafer 402 or handle silicon is subsequently removed by a semiconductor removing procedure such as mechanical grinding or etching. Various metal contacts or pads to active regions can be constructed. For example, additional metal traces and pads are deposited, patterned, and etched over the active regions. In one embodiment, a Passivation layer is deposited over the entire backside for protection.

Figure 4D:
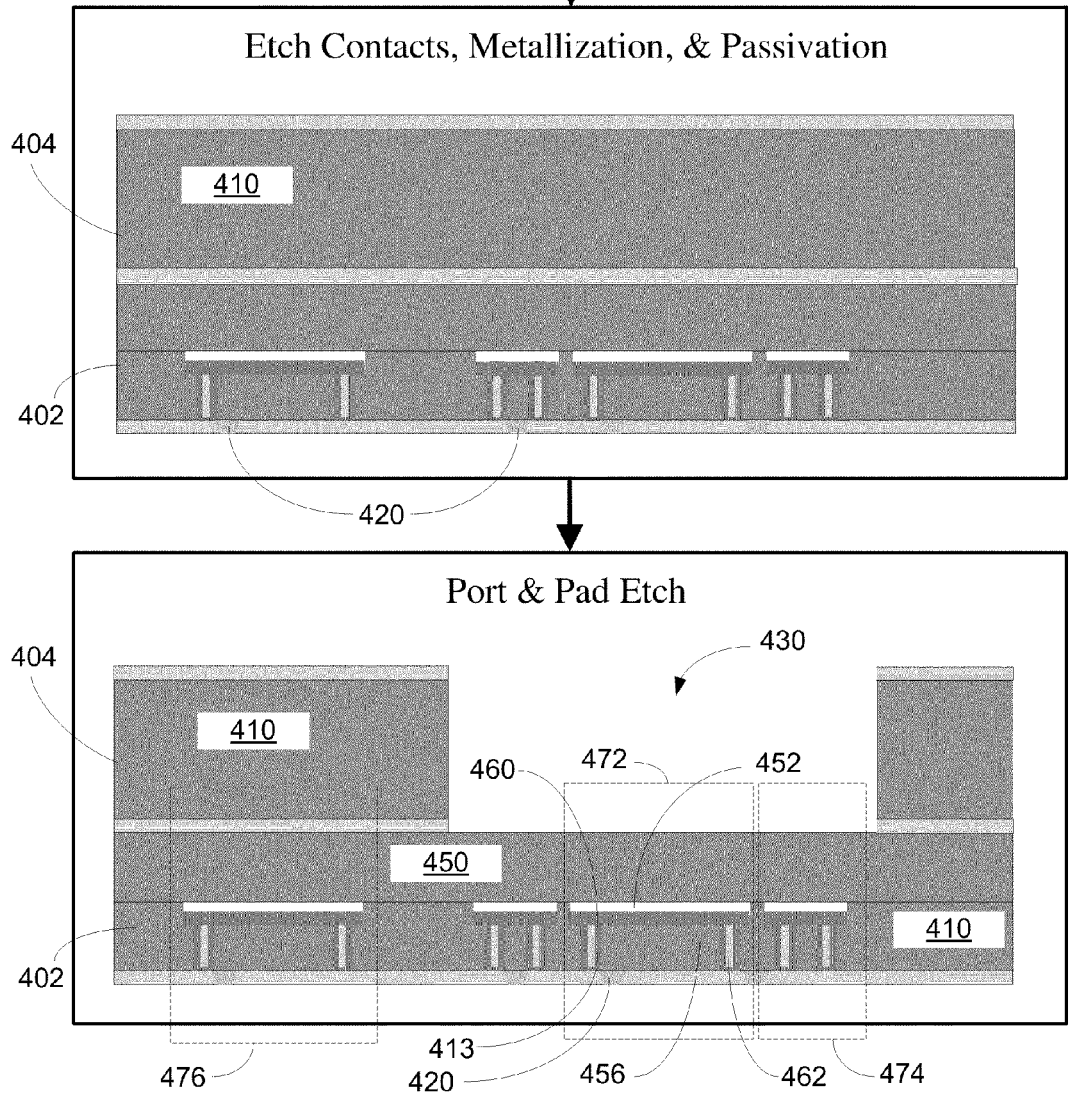

FIG. 4D illustrates a process of fabricating a sensing device having three sensing elements in accordance with one embodiment of the present invention. After backside or handle silicon side of second SOI bonded wafer 404 is patterned, the exposed silicon is etched by the process of DRIE to reach the top electrode 450 of SOI wafer 404 for creating an opening or pressure port 430. Opening 430 exposes top electrodes 450 or diaphragms of active pressure sensor(s) ("Psense") 472 and the static reference sensor(s) ("Rstatic") 474 to sense the pressure as well as the ambient conditions. The front-side is patterned and etched to create Input/Output ("I/O") pad openings 420 through the Passivation process. SOI wafer 402 includes an active gap 452, isolation of active sensor(s) or absolute sensing element 476, electrical vias 413, and metal traces and pads 420. SOI wafer 404 forms the top electrode or diaphragm 450 and a pressure port 430.

To summarize, the process starts from electrical vias 413 to the formation of active gap 452 using a pair of SOI processed wafers 402-404 through a bonding procedure. The metallization is processed and pressure port 430 is etched to complete an MCPS wherein the MCPS includes two single-crystal SOI wafers 402-404. One SOI wafer 402 provides a base electrode of MCPS situated at the opposite end of a top electrode across a gap. The second SOI wafer or wafer 404 forms top electrodes or diaphragms 450 and pressure port 430 which exposes one or more sensors to the ambient conditions. It should be noted that the above-described process to fabricate an MCPS is an exemplary fabrication process, and other process may be used to produce similar or the same MCPS.

The exemplary embodiment of the present invention includes various processing steps, which will be described below. The steps of the embodiment of the present invention may be embodied in machine or computer executable instructions. The instructions can be used to cause a general purpose or special purpose system, which is programmed with the instructions, to perform the steps of the exemplary embodiment of the present invention. Alternatively, the steps of the present embodiment can be performed by specific hardware components that contain hard-wired logic for performing the steps, or by any combination of programmed computer components and custom hardware components.

Figure 5:
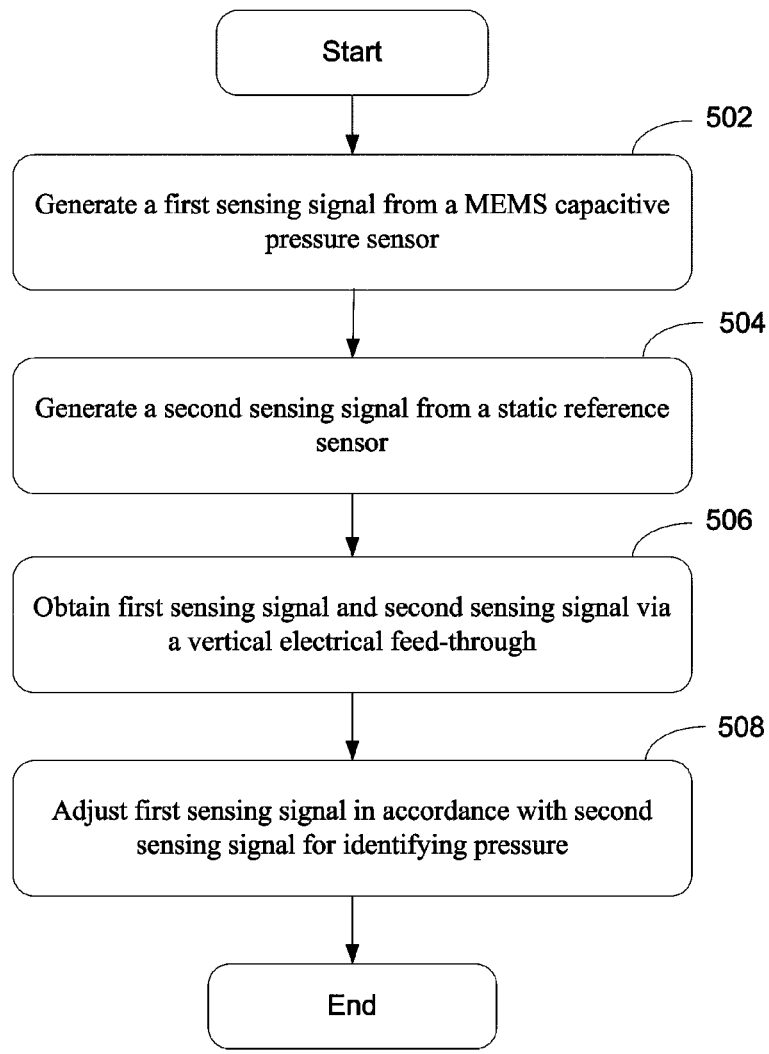
FIG. 5 is a flowchart illustrating a process of generating a pressure sensing signal using an MEMS capacitive pressure sensor having a vertical electric feed-through in accordance with one embodiment of the present invention.

FIG. 5 is a flowchart 500 illustrating a process of generating a pressure sensing signal using an MEMS capacitive pressure sensor or MCPS having a vertical electric feed-through in accordance with one embodiment of the present invention. At block 502, a process capable of sensing a pressure generates a first sensing signal from a pressure sensor by detecting deformation of an internal gap or gap. For example, the process senses a deflection of the top electrode of a capacitive pressure sensor.

At block 504, the process generates a second sensing signal from a static reference sensor capable of detecting ambient conditions. Note that the second sensing signal can be used to adjust or correct the first sensing signal whereby a more accurate pressure measurement can be obtained.

At block 506, the process obtains the first sensing signal and the second sensing signal via one or more vertical electric feed-throughs formed on sidewall of a silicon pillar. In one embodiment, the process is able to receive electrical signals traveling from two electrodes to an output terminal via the vertical electric feed-throughs.

At block 508, after adjusting the first sensing signal in accordance with the second sensing signal, a more accurate pressure measurement is identified. For example, the process is able to subtract the second sensing signal from the first sensing signal to generate an enhanced pressure measurement. In one embodiment, the process is also capable of obtaining a third sensing signal from an absolute reference sensor. The third sensing signal can be used to calibrate the MSPS.

The embodiments of pressure sensing device is not only resolving concerns in developing the capacitive pressure sensor, but also extending measurement capabilities. The sensing device includes more than one sensing elements on a die. Disclosed embodiment(s) allow diaphragms of capacitive sensors to expose a medium for pressure measurement. A reference sensor is fully isolated from the ambient condition to provide an absolute reference signal.

The Psense includes flexible diaphragm wherein the diaphragm deflects in accordance with pressure presented at the pressure port. Alongside the Psense, the Rstatic is configured to be insensitive to pressure through its structural configuration. As such, the diaphragm of Rstatic deflects at a minimal level, if any, at the predefined application conditions. While the Psense and Rstatic are exposed to an ambient condition, the Rabsolute is fully isolated from the ambient condition with its top electrode (diaphragm) and gap fully encapsulated in the die. As such, the absolute sensing signal generated by Rabsolute does not change due to pressure presented in the pressure port and/or ambient conditions. The absolute sensing signal can, for example, provide information relating to the nature of the device such as device defects and/or device deterioration overtime.

The MCPS, in one embodiment, includes the capacitive charge generated from the top electrode across the gap to the bottom electrode to reach the output terminals. The MCPS creates a new bottom electrode structure to carry the charge through the bulk of the structure without limitations on the thickness. The bottom electrode structure also provides better electrical performance by reducing parasitic capacitances to reduce noise or cross-talking. Instead of using conventional conductive bulk material as the bottom electrode, the MCPS creates a conductive path on top as well as lateral sidewalls of the bulk material. The top surface of the bulk material is highly doped to a shallow depth of the bulk material to create the bottom electrode of the sensor. The sidewalls of the through silicon vias (or feed-throughs) are again highly doped to shallow depth for conductive path(s) from the bottom electrode to the output terminals. In one embodiment, each opposing highly doped sidewalls can serve as independent electrical connection paths. Once the sidewalls are doped, the space or trenches between the sidewalls are refilled with dielectric material such as oxides and poly-silicon for insulation. The ploy-silicon trenches, fillers, layers, or pillars can be used for structural support as well as electrical, optical, or thermal isolation.

While particular embodiments of the present invention have been shown and described, it will be obvious to those skills in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A sensing device, comprising:
    a first sensing element disposed over a semiconductor die and configured to generate a first sensing signal upon detecting pressure;
    a second sensing element disposed over the semiconductor die adjacent to the first sensing element, and configured to generate a second sensing signal upon sensing ambient conditions; and
    a sensing circuit coupled to the second sensing element and capable of generating a pressure sensing signal in response to the first sensing signal and the second sensing signal;
    wherein the first sensing element includes a pressure diaphragm formed with flexible material able to deflect under pressure and functioned as a first capacitor electrode, a gap situated adjacent to the pressure diaphragm able to alter its physical shape in response to the pressure, a silicon pillar disposed on one side of the gap opposite from the pressure diaphragm, and a second capacitor electrode formed by directly doping in bottom doped sidewall of the silicon pillar adjacent to the gap via a doping process.

2. The sensing device of claim 1, further comprising a third sensing element disposed over the semiconductor die adjacent to the first sensing element, and configured to generate a third sensing signal indicating an absolute condition.

3. The sensing device of claim 2,
wherein a first sensing element is pressure sensor capable of sensing pressure;
wherein a second sensing element is a static sensor capable of sensing ambient conditions; and
wherein a third sensing element is an absolute sensor capable of sensing absolute conditions.

4. The sensor device of claim 1, wherein the first sensing element includes a pressure diaphragm formed with flexible material capable of deflecting under pressure.

5. The sensor device of claim 4, wherein the first sensing element includes a gap situated under the pressure diaphragm capable of altering its physical shape in response to deflection of the pressure diaphragm.

6. The sensor device of claim 5, wherein the first sensing element includes a first electric feed-through formed on a sidewall of a silicon pillar situated between the gap and an electrical contact for conducting electrical signals.

7. The sensing device of claim 1, wherein a first sensing element disposed over a semiconductor die and configured to generate a first sensing signal upon detecting pressure is a micro-electro-mechanical system ("MEM") capacitive pressure sensor capable of measuring one of a gas pressure, a liquid pressure, a fluid pressure, and a chemical property change.

8. The sensing device of claim 7, wherein the sensing circuit adjusts measurements generated by the MEM capacitive pressure sensor in accordance with surrounding conditions provided by the second sensing element.

9. A pressure sensor, comprising:
a pressure diaphragm formed with flexible material capable of deflecting under pressure, wherein the pressure diaphragm is a first capacitor electrode;
a gap situated under the pressure diaphragm capable of altering its physical shape in response to deflection of the pressure diaphragm;
a silicon pillar disposed on one side of the gap opposite from the pressure diaphragm;
a second capacitor electrode formed by directly doping in bottom doped sidewall of the silicon pillar adjacent to the gap via a doping process; and
an electric feed-through formed on a vertical sidewall of the silicon pillar and configured to couple the second capacitor electrode to an electrical contact for conducting electrical signals.

10. The pressure sensor of claim 9, wherein the pressure diaphragm is a deflecting electrode able to conduct electrical signal.

11. The pressure sensor of claim 10, wherein the pressure diaphragm includes a first surface and a second surface, wherein the first surface exposes to a pressure port, wherein the second surface is adjacent to the gap.

12. The pressure sensor of claim 11, wherein the gap includes a first side and a second side, wherein the first side of the gap is adjacent to the second surface of the pressure diaphragm, and wherein the second side of the gap is adjacent to a first side of the silicon pillar.

13. The pressure sensor of claim 12, wherein the first side of the silicon pillar is electrically conductive via doping process, wherein the first side of the silicon pillar is a second electrode of the pressure sensor.

14. The pressure sensor of claim 10, wherein the electric feed-through is formed on a second side of the silicon pillar via doping process, wherein the electric feed-through is configured to transport capacitive charge from the deflecting electrode across the gap to the second electrode to reach an output terminal.

15. The pressure sensor of claim 10, further comprising a dielectric wall between one or more sidewalls for insulation and structure support.

16. A method of pressure sensing, comprising:
generating a first sensing signal from a micro-electro-mechanical system ("MEMS") capacitive pressure sensor via deformation of an internal gap;
generating a second sensing signal from a static reference sensor capable of detecting ambient conditions;
obtaining the first sensing signal and the second sensing signal via a vertical electric feed-through formed on sidewall of a silicon pillar; and
identifying a pressure read in accordance with the first sensing signal and the second sensing signal;
wherein the MEMS capacitive pressure sensor includes a pressure diaphragm functioned as a first capacitor electrode, a gap situated adjacent to the pressure diaphragm able to alter its physical shape in response to the pressure, and a second capacitor electrode formed by directly doping in bottom doped sidewall of a silicon pillar adjacent to the gap via a doping process.

17. The method of claim 16, further comprising obtaining a third sensing signal from an absolute reference sensor and calibrating the MEMS capacitive pressure sensor with the third sensing signal.

18. The method of claim 17, wherein generating a first sensing signal from a MEMS capacitive pressure sensor includes sensing deflection of a deflecting electrode of the MEMS capacitive pressure sensor.

19. The method of claim 18, wherein obtaining the first sensing signal and the second sensing signal via a vertical electric feed-through formed on sidewall of a silicon pillar includes receiving electrical signals traveling from two electrodes to an output terminal via the sidewall.

20. The method of claim 19, wherein adjusting the first sensing signal in accordance with the second sensing signal for identifying pressure includes subtracting the second sensing signal from the first sensing signal.

* * * * *